United States Patent

Denison

[15] 3,643,666

[45] Feb. 22, 1972

[54] STONE GUARD FOR COMBINES

[72] Inventor: Henry Hoyt Denison, Moline, Ill.

[73] Assignee: Deere & Company, Moline, Ill.

[22] Filed: Jan. 30, 1970

[21] Appl. No.: 7,002

[52] U.S. Cl. .................................................. 130/27 JT
[51] Int. Cl. ................................................... A01f 12/20
[58] Field of Search ........................ 130/27.9 JT, 27 JT

[56] References Cited

UNITED STATES PATENTS

| | | | |
|---|---|---|---|
| 285,422 | 9/1883 | Lockhart | 130/27 JT |
| 2,528,232 | 10/1950 | Krause | 130/27 JT |
| 2,305,159 | 12/1942 | Heckman et al. | 130/27 JT |
| 57,541 | 8/1866 | Melick | 130/27 JT |

FOREIGN PATENTS OR APPLICATIONS

| | | | |
|---|---|---|---|
| 81,087 | 9/1956 | Denmark | 130/27 JT |

Primary Examiner—Russell R. Kinsey
Assistant Examiner—J. A. Oliff
Attorney—H. Vincent Harsha, Harold M. Knoth, William A. Murray and John M. Nolan

[57] ABSTRACT

A plurality of adjacent fingers form a door which extends fore-and-aft between the lower edge of the crop inlet opening in a combine body and the front edge of the concave. The door is composed of three individual sections, each of which is mounted on a transverse pivot adjacent the crop inlet opening and adapted to swing downwardly when a rock or like object is introduced between one of the sections of fingers and the threshing cylinder, thereby allowing such objects to fall away before entering the area between the cylinder and concave. A spring acting through a toggle-type linkage urges each of the finger sections upwardly against an adjustable stop, the linkage being so arranged that the urging force transmitted to the sections diminishes rapidly as the sections swing downwardly. The shape of the fingers is such that an entering rock will trip the mechanism a substantial distance forwardly of the leading edge of the concave.

15 Claims, 4 Drawing Figures

INVENTOR.
H. HOYT DENISON

INVENTOR.
H. HOYT DENISON

STONE GUARD FOR COMBINES

BACKGROUND OF THE INVENTION

The present invention relates generally to harvesting machines of the type having a cylinder and concave threshing mechanism, and more particularly to a device for preventing rocks and like objects from entering between the cylinder and concave.

The threshing mechanism of a conventional combine includes a large rotating threshing cylinder and an adjacent, stationary concave which cooperate to thresh the grain from the crop passing therebetween. The crop is delivered rearwardly to the threshing mechanism from a forward harvesting platform or header, which, in rocky areas, will occasionally pick up a rock along with the crop. Unless the rock is removed before it enters between the cylinder and concave, extensive damage to these elements may result.

Various devices have been proposed to eliminate this problem. For example, a trough is commonly provided forwardly of the concave to receive such rocks before they can be introduced between the cylinder and concave. Although this device has generally performed satisfactorily, it has the disadvantage of requiring that the operator periodically stop the combine and remove the rocks which have collected in the trough. Another common device, of which U.S. Pat. Nos. 2,812,766 to Goffnett issued Nov. 12, 1957 and 2,959,175 to Oberholtz et al. issued Nov. 8, 1960 are illustrative, utilizes a door forwardly of the concave which is adapted to swing downwardly when a rock is introduced between the plate and the cylinder, thereby allowing the rock to pass beneath the concave. Again, however, the operator must stop the combine and reset the platform every time it is tripped.

An improved modification of this latter device is disclosed in U.S. Pat. No. 2,305,159 to Heckman et al. issued Dec. 15, 1942. The Heckman device also utilizes a door yieldably mounted forwardly of the concave, though it further includes a spring mechanism which automatically returns the door to its operating position after a rock has been discharged. Although this feature obviates the need for the operator to periodically reset the mechanism, certain other features of the Heckman device render it not entirely satisfactory for use with today's high-capacity combines. For example, the shape of the door utilized in Heckman is such that an entering rock will not trip the mechanism until almost to the leading edge of the concave. At this point, the momentum of the rock in the direction of the concave, imparted by the high rotational speed of the cylinder, is of such magnitude that instead of falling through the opening, the rock will instead strike the concave. This problem is aggravated by the fact that, in the Heckman design, the spring force maintaining the door in its normal position increases as the door is opened downwardly. Thus, although a rock may hit the door with sufficient force to partially open it against the urging of the spring, the force may not be sufficient to open the door wide enough to allow the rock to pass. An additional feature of the Heckman device, the provision of a single door extending the entire width of the cylinder, is somewhat undesirable in that an excessive amount of unthreshed grain is allowed to fall through the relatively large opening created when the device is tripped.

SUMMARY OF THE INVENTION

It is, accordingly, a primary object of the present invention to provide an improved stone guard for a cylinder and concave. It is a further object to provide such a device which is simple and reliable in operation.

The invention consists, generally, of a transverse pivot adjacent the crop inlet opening and forwardly of the leading edge of the concave, a door swingable about the pivot normally extending to the edge of the concave, and a spring acting through a toggle-type linkage urging the door upwardly against the stop defining its normal position. The door is provided with a hump between its fore-and-aft edges such that the radial clearance between the cylinder and the door is least at a point substantially forwardly of the leading edge of the concave. Thus, a stone entering with the crop will first come in contact with the door at this point rather than at a point adjacent the edge of the concave, and will fall downwardly through the open space created when the door is swung downwardly before its rearward momentum carries it into the concave. Additionally, the toggle linkage is so designed that the force urging the door toward its normal position diminishes rapidly as the door is swung downwardly. Thus, a rock having sufficient momentum to initially trip the mechanism will open the door sufficiently to allow the rock to pass. The door consists of a plurality of independently swingable sections, which results in greater operating sensitivity than would be the case if a single continuous door were utilized. When one section is tripped, the others remain in place, thus reducing both the amount of unthreshed grain lost through the opening and the return momentum of the door. In addition, each section is formed of a plurality of spaced rods or fingers, such that the grain separated from the crop in the area of the door can fall between adjacent fingers.

BRIEF DESCRIPTION OF THE DRAWINGS

The invention will be described in conjunction with the accompanying drawings in which.

DESCRIPTION OF THE PREFERRED EMBODIMENT

Figure 1:
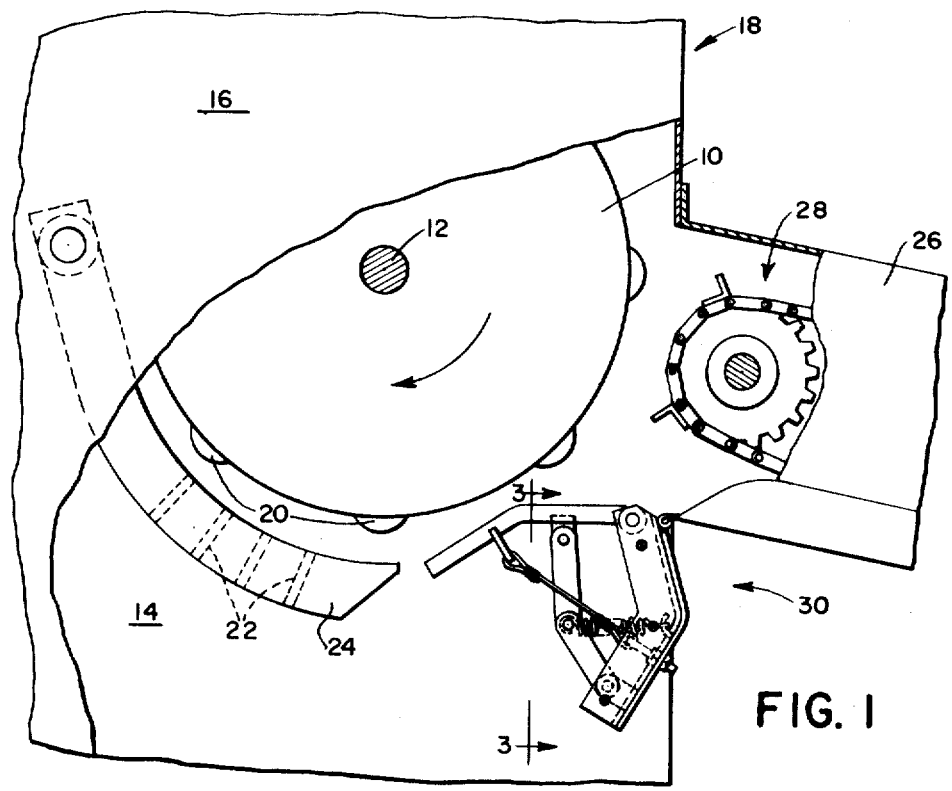
FIG. 1 is a partial side view of a combine, with portions broken away to more clearly illustrate the invention.

The threshing system of a conventional combine, illustrated partially in FIG. 1, includes a transverse threshing cylinder 10 mounted on a shaft 12 for rotational movement in the direction indicated by the arrow, the shaft 12 being journaled at its respective ends in sidewalls 14 and 16 of the combine threshing house 18. A plurality of rasp bar elements 20, spaced circumferentially about the cylinder 10, cooperate with the grate members 22 on a stationary concave 24 mounted below the cylinder 10 to thresh the grain from the crop passing therebetween. As is well known in the art, the concave 24 is adjustably mounted relative to the cylinder 10, whereby the clearance therebetween can be varied to best suit the particular crop being threshed. A conventional crop-gathering device or header mounted forwardly on the combine (not shown) severs the crop from the field as the machine advances therealong and feeds it centrally to a feeder house, shown partially at 26, which extends rearwardly to the threshing house 18. Contained within the feeder house 26 is a continuous, flight-type conveyor 28 which moves the crop rearwardly to a discharge point forwardly of the concave 24.

Figure 3:
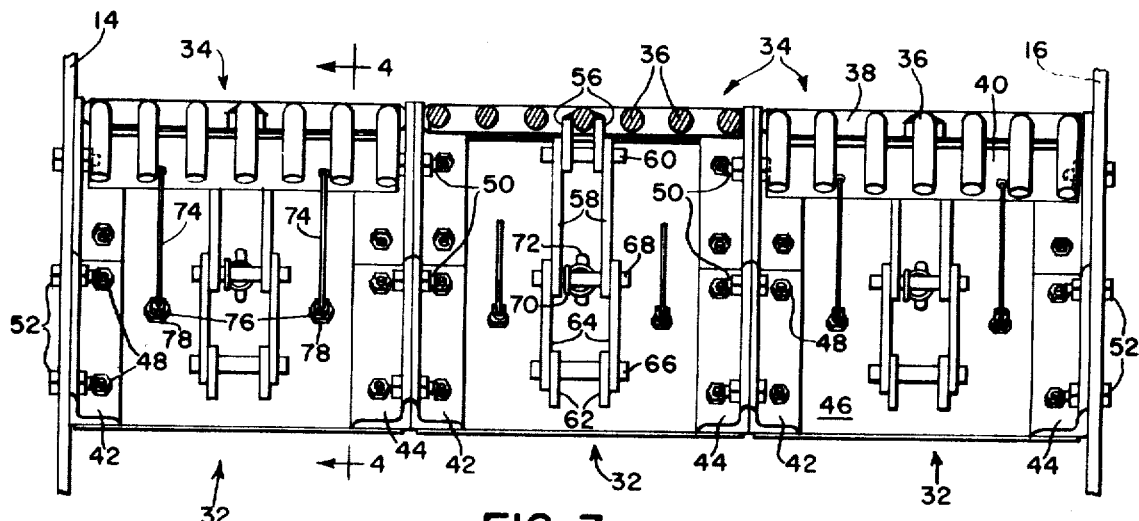
FIG. 3 is an enlarged rear view of the invention, the middle section being shown along the line 3—3 of FIG. 1.

When operating under rocky soil conditions, the forward gathering device will occasionally pick up a rock which will be conveyed rearwardly with the crop to the threshing mechanism. According to the present invention, a stone guard, indicated generally by the numeral 30, is mounted between the discharge end of the conveyor 28 and the leading edge of the concave 24 to remove such rocks from the crop before it is introduced between the cylinder and concave. As shown in FIG. 3, the stone guard 30 comprises three identical sections 32 which conjunctively span the entire width of the threshing house 18 between the walls 14 and 16, the sections 32 being independently operable as will hereinafter appear. Although three sections are shown, the stone guard could consist of any number of units.

Each section 32 has a separate grate or door 34 extending fore-and-aft between the discharge end of the conveyor 28 and the leading edge of the concave 24. The door 34 consists of a plurality of transversely spaced, bent rods or fingers 36 commonly joined at their forward ends, as by welding, to a transverse pivot member 38. The rods 36 are additionally connected by a transverse bar 40 welded to the undersides of the rods rearwardly of the member 38. The ends of the pivot member 38 are journaled, respectively, in aligned apertures in left and right side members 42 and 44. The members 42 and 44 are held in rigid transverse relation by means of a transverse plate 46 secured at its respective sides to the transverse legs of the members 42 and 44 with bolts or similar fastening means 48. As shown in FIG. 3, the center section of the rock guard 30 is secured to the two outer sections by means of bolts 50 interconnecting the fore-and-aft legs of adjacent side members 42 and 44, and the outer sections are, in turn, secured to the combine threshing house 18 by means of bolts 52 interconnecting the fore-and-aft legs of the side members 42 and 44 with the respective sidewalls 14 and 16. It is thus seen that the three sections 32 form a rigid transverse unit spanning the walls 14 and 16.

A toggle-type linkage, indicated generally at 54, connects each of the doors 34 with its respective transverse plate 46. The linkage comprises a pair of brackets 56 welded to opposite sides of and extending downwardly from the center rod 36, a pair of upper arms 58 pivotally mounted at their upper ends on a pin 60 received in the brackets 56, a pair of brackets 62 fixed to the rear surface of the plate 46, a pair of lower arms 64 pivotally mounted at their lower ends on a pin 66 received in the brackets 62, and a pin 68 pivotally connecting the upper and lower ends of the respective arms 64 and 58. A helical spring 70, acting between the pin 68 and a lug 72 welded to the rear surface of the plate 46, urges the arms 58 and 64 into alignment, which, in turn, urges the door 34 upwardly about the pivot member 38. Such movement of the door 34 is limited, however, by a pair of transversely spaced flexible cables or stop means 74 acting between the plate 46 and the door. A loop formed in the upper end of each of the cables 74 is received in an aperture in the bar 40, and a similar loop in the lower end of the cables is received in the eye of a threaded stud 76. The stud 76 is adjustably held in the plate 46 by means of cooperatively threaded nuts 78 on either side of the plate. The normal position of the door 34 can thus be varied by appropriate adjustment of the stud 76.

Figure 4:
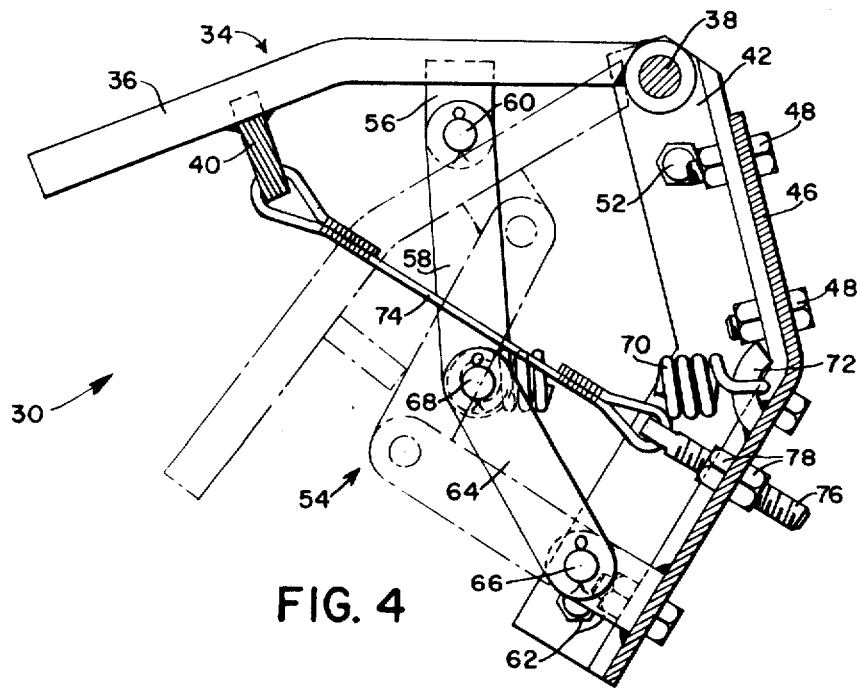
FIG. 4 is an enlarged view taken along the line 4—4 of FIG. 3, with the folded position of the door shown in phantom.

It will be apparent from FIG. 4 that the toggle linkage 54 is so constructed that arms 58 and 64 move increasingly off center as the door pivots downwardly to its rock-ejecting position. Although the length of the spring 70 and thus the force exerted between the lug 72 and the pin 68 increases as the door pivots, the geometry of the linkage is such that the effective urging force transmitted to the door concurrently decreases.

Figure 2:
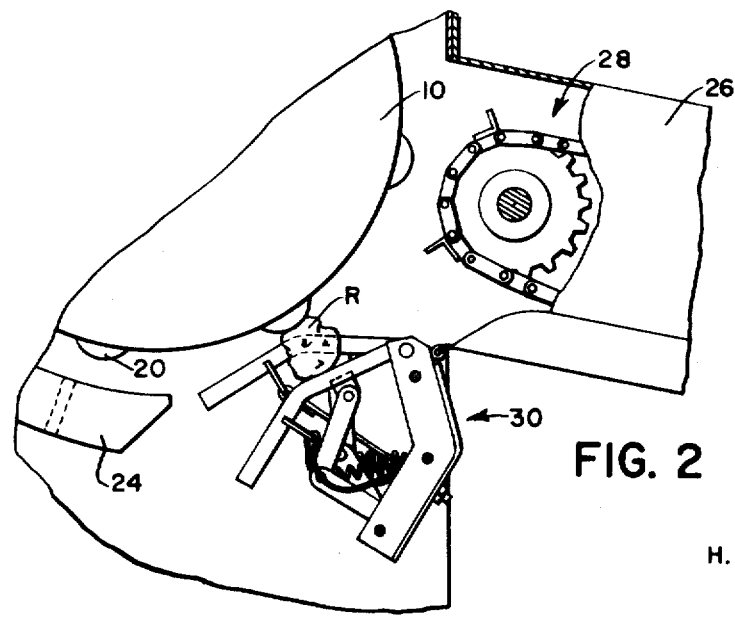
FIG. 2 is a view similar to FIG. 1, showing one of the door sections in its tripped position.

As shown in FIGS. 1 and 2, the door 34 is so shaped that when the rock guard 30 is in its normal operating position, the point of minimum radial clearance between the door 34 and the cylinder 10 is located a substantial distance forwardly of the leading edge of the concave 24, substantially midway between the fore-and-aft ends of the door. This minimum clearance, adjustable as previously noted by means of nuts 78 on the stud 76, determines the minimum size rock that will be ejected by the mechanism.

In operation, a rock introduced with the crop, such as that designated R in FIG. 2, will be wedged between the cylinder 10 and the door 34 at the point of least clearance or, depending on its size, at a point forwardly thereof. The door will thus be forced to pivot downwardly, creating a gap forwardly of the concave, and the downward momentum of the rock will carry it therethrough. Although the rock R is given a substantial rearward momentum by the cylinder 10 tending to carry it into the edge of the concave, the distance between the concave and the point at which the mechanism is initially tripped is such that the downward momentum of the rock will carry it through the gap before it can strike the concave.

As shown in FIG. 4, the downward movement of the door 34 is limited by the bar 40 contacting the arms 58. After the rock is ejected, the spring 70 returns the door to its operating position against the stop means 74. Only one section 32 is normally tripped by a single rock; the other two sections remain in their operating positions, thereby minimizing the loss of unthreshed grain through the gap and the return momentum of the door.

I claim:

1. In a crop harvesting machine having a transverse threshing cylinder, a concave supported on the machine adjacent the lower portion of the cylinder for cooperation therewith, and crop conveyor means mounted forwardly on the machine for moving the crop rearwardly to the cylinder and concave, said conveyor means having a discharge end spaced forwardly from the concave, the improvement residing in means to prevent rocks and like objects from entering between the cylinder and concave, said means comprising: a stationary support on the machine; transverse pivot means carried by the support adjacent the discharge end of the conveyor; transverse door means mounted on the pivot means for swinging movement between a normal operating position wherein the door means extends fore-and-aft between the pivot means and the concave, and a rock-ejecting position wherein the door means is swung downwardly about said pivot means from said normal operating position; means acting between the support and the door means for exerting a decreasing upward biasing force on the door means as the latter is swung downwardly from its normal operating position to its rock-ejecting position; and stop means acting between the support and the door means to limit the upward movement of the door means to its normal operating position.

2. In a crop harvesting machine having a transverse threshing cylinder, a concave supported on the machine adjacent the lower portion of the cylinder for cooperation therewith, and crop conveyor means mounted forwardly on the machine for moving the crop rearwardly to the cylinder and concave, said conveyor means having a discharge end spaced forwardly from the concave, the improvement residing in means to prevent rocks and like objects from entering between the cylinder and concave, said means comprising: a stationary support on the machine; transverse pivot means carried by the support adjacent the discharge end of the conveyor; transverse door means mounted on the pivot means for swinging movement between a normal operating position wherein the door means extends fore-and-aft between the pivot means and the concave, and a rock-ejecting position wherein the door means is swung downwardly about said pivot means from said normal operating position, said door means having a point of minimum radial clearance with the threshing cylinder substantially midway between its fore-and-aft ends when in its normal operating position; means acting between the support and the door mean for biasing the latter upwardly about said pivot means, said biasing means including means for exerting a decreasing upward biasing force on the door means as the latter is swung downwardly form its normal operating position to its rock-ejecting position and stop means acting between the support and the door means to limit the upward movement of the door means to its normal operating position.

3. The invention described in claim 1 wherein said means for exerting a decreasing upward biasing force comprises toggle linkage means having first arm means pivotally mounted on the door means, second arm means pivotally mounted on the support, and means pivotally connecting said first and second arm means; and said biasing means further includes spring means acting between said toggle linkage means and the support.

4. The invention described in claim 1 wherein said door means comprises a plurality of individual transverse sections, each section being independently swingable about the transverse pivot means and each being independently biased upwardly about said pivot means by said biasing means.

5. The invention described in claim 1 wherein the door means comprises a plurality of transversely spaced, fore-and-aft extending rod members.

6. The invention described in claim 1 wherein the stop means comprises flexible element means.

7. The invention described in claim 6 wherein the flexible element means comprises cable means.

8. The invention described in claim 1 wherein the stop means includes adjustment means for varying the normal operating position of the door means.

9. In a crop harvesting machine having a transverse threshing cylinder, a concave supported on the machine adjacent the lower portion of the cylinder for cooperation therewith, and crop conveyor means mounted forwardly on the machine for moving the crop rearwardly to the cylinder and concave, said conveyor means having a discharge end spaced forwardly from the concave, the improvement residing in means to prevent rocks and like objects from entering between the cylinder and concave, said means comprising: a stationary support on the machine; transverse pivot means carried by the support adjacent the discharge end of the conveyor; transverse door means mounted on the pivot means for swinging movement between a normal operating position wherein the door means extends fore-and-aft between the pivot means and the concave, and a rock-ejecting position wherein the door means is swung downwardly about said pivot means from said normal operating position; means acting between the support and the door means for biasing the latter upwardly about said pivot means, said biasing means exerting a decreasing biasing force on the door means as the latter is swung downwardly from its normal operating position to its rock-ejecting position; and stop means acting between the support and the door means to limit the upward movement of the door means to its normal operating position.

10. The invention described in claim 9 wherein the stop means includes adjustment means for varying the normal operating position of the door means.

11. The invention described in claim 10 wherein said means exerting a decreasing biasing force comprises toggle linkage means having first arm means pivotally mounted on the door means, second arm means pivotally mounted on the support, and means pivotally connecting said first and second arm means; and said biasing means further includes spring means acting between said toggle linkage means and the support.

12. The invention defined in claim 10 wherein said door means has a point of minimum radial clearance with the threshing cylinder intermediate its fore and aft ends when in its normal operating position.

13. The invention defined in claim 10 wherein said door means has a point of minimum radial clearance with the threshing cylinder substantially midway between its fore-and-aft ends when in its normal operating position.

14. The invention defined in claim 10 wherein said door means comprises a plurality of individual transverse sections, each section being independently swingable about the transverse pivot means and each being independently biased upwardly about said pivot means by said biasing means.

15. The invention defined in claim 10 wherein the door means comprises a plurality of transversely spaced, fore-and-aft extending rod members.

* * * * *

UNITED STATES PATENT OFFICE
CERTIFICATE OF CORRECTION

Patent No. 3,643,666     Dated 22 February 1972

Inventor(s) Henry Hoyt Denison

It is certified that error appears in the above-identified patent and that said Letters Patent are hereby corrected as shown below:

Column 4, line 53, change "form" to -- from --; lines 57, 65, 70, and 73, change "1" to -- 2 --.

Column 5, line 3, change "1" to -- 2 --.

Column 6, lines 5, 12, 16, 20, and 25, change "10" to -- 9 --.

Signed and sealed this 27th day of June 1972.

(SEAL)
Attest:

EDWARD M. FLETCHER, JR.
Attesting Officer

ROBERT GOTTSCHALK
Commissioner of Patents